United States Patent Office 3,804,816
Patented Apr. 16, 1974

---

3,804,816
COPOLYMERS OF ETHYLENE WITH ORGANO-VINYLTIN MONOMERS
Sergei Mikhailovich Samoilov, Simonovsky val. 8, kv. 60; Nikolai Aefredovich Plate, Novoslobodskaya ulitsa 67/69, kv. 93; Vadim Vasilievich Maltsev, ulitsa matveevskaya 10, korpus 2, kv. 169; and Viktor Nikolaevich Monastyrsky, ulitsa vasilievskaya 9, kv. 62, all of Moscow, U.S.S.R.; and Valentin Alexeevich Kargin, deceased, late of Moscow, U.S.S.R.; by Kaleria Petrovna Velichko, administratrix, ulitsa Arkadia Gaidara 7, kv. 4, Moscow, U.S.S.R.
No Drawing. Filed Sept. 22, 1970, Ser. No. 74,525
Int. Cl. C08f 15/02, 15/04
U.S. Cl. 260—88.1 R  2 Claims

ABSTRACT OF THE DISCLOSURE

Copolymers of ethylene with vinyl monomers, which are derivatives of vinyltin of the general formula $$CH_2=CHSnR_1R_2R_3$$

wherein $R_1$, $R_2$, $R_3$ are the same or different radicals: alkyls with the number of carbon atoms from 1 to 6, or phenyl, the content of [—$CH_2$—$CH(SnR_1R_2R_3)$—] links in the copolymer being 1–30 mol. percent, and that of [—$CH_2$—$CH_2$—] links, 99–70 mol. percent. Said copolymers are produced by a method which includes copolymerizing ethylene with derivatives of vinyltin of the above-specified general formula at a molar ratio of ethylene to organovinyltin monomers equal to 20–98:80–2 respectively, under a pressure of 50–3000 atm., at a temperature of 50–300° C., in the presence of initiators of free-radical type. The copolymers thus produced can be used as antiwear additions to lubricants.

---

The present invention relates to copolymers of ethylene with vinyl monomers, to methods of their production and to application thereof.

Known in the art are copolymers of ethylene and oxygen-containing vinyl monomers, such as vinyl acetate or ethyl acrylate, which are produced by copolymerizing ethylene with said vinyl monomers under a pressure of 50–3000 atm., at a temperature of 50–300° C., in the presence of initiators of free-radical type (cf. Raff, R. A. V., Doak, K. W., Crystalline Olefin Polymers, High Polymers, vol. XX, p. 337; Interscience Publishers, J. Wiley, New York, London, Sydney, 1965).

The known copolymers of ethylene with vinyl monomers are used in various branches of industry, e.g., as additions, improving the viscous properties of lubricants.

However, said copolymers of ethylene do not feature antiwear properties and thus are not commonly used as additions to lubricants.

The object of the present invention is to provide new kinds of copolymers of ethylene with vinyl monomers, which feature properties of antiwear additions for lubricants, and also to provide a method for producing such copolymers.

In accordance with said and other objects, the present invention provides copolymers of ethylene with derivatives of vinyltin of the general formula $CH_2=CHSnR_1R_2R_3$, where $R_1$, $R_2$, $R_3$ are the same or different radicals: alkyls with the number of carbon atoms from 1 to 6, or phenyl, the content of links [—$CH_2$—$CH(SnR_1R_2R_3)$—] in the copolymer being 1–30 mol. percent, and that of links [—$CH_2$—$CH_2$—] being 99–70 mol. percent.

The herein-proposed stanniferous copolymers of ethylene can be produced by a method in which ethylene is copolymerized with vinyl monomers under a pressure of 50–3000 atm., at a temperature of 50–300° C., in the presence of initiators of free-radical type. In said method, according to the invention, as vinyl monomers use is made of derivatives of vinyltin of the general formula $$CH_2=CHSnR_1R_2R_3$$

where $R_1$, $R_2$, $R_3$ are the same or different radicals: alkyls with the number of carbon atoms from 1 to 6, or phenyl, the organovinyltin monomers and ethylene being taken in a molar ratio equal to 2–80:98–20 respectively.

As pointed out above, the copolymers of ethylene with derivatives of vinyltin can be used for enhancing the antiwear properties of lubricants.

The method of producing copolymers of ethylene with derivatives of vinyltin is effected as follows:

Ethylene is copolymerized with vinyltin derivatives of the above-specified formula under a pressure of 50–3000 atm. and at a temperature of 50–300° C., with the use of free-radical initiators (such as peroxides, azo-compounds, etc.). The copolymerization is carried out either in bulk, without recourse to solvents, or in a solution of organic compounds: benzene, xylene, chlorobenzene, tetrahydrofuran, etc.

For copolymerization ethylene is employed, which contains not more than 0.001 vol. percent of oxygen.

The organovinyltin monomers and an initiator (in case of bulk copolymerization), or the organovinyltin monomers, an initator, and an organic solvent (in case the copolymerization is carried out in a solvent medium) are charged into an autoclave in a stream of ethylene. The organovinyl monomers and ethylene are taken in a molar ratio of 2–80:98–20 respectively. The copolymerization proceeds during 5–320 minutes. During the reaction the pressure and temperature are maintained constant with an accuracy of ±50 atm. and ±2° C. On completion of the reaction, the reaction mixture is discharged from the autoclave, through a system of traps, in which polymer products are accumulated. The latter are used either without purification, or are purified from the unreacted organovinyltin monomer and mechanical admixtures. The purification is carried out by dissolving the copolymers under heating in benzene, xylene, toluene, or in other solvents, the concentration of the resulting solution being 10–50 wt. percent for the copolymer. Then the solution is filtered at a temperature of 70–120° C., and the copolymers are precipitated in a three-sixfold amount (in relation to the volume of the solvent) of acetone, alcohol, or other precipitants at room temperature. The precipitate is filtered off or centrifuged and dried at a temperature of 20–70° C. to constant weight.

For testing the copolymers as antiwear additions to lubricants, the copolymers are dissolved at a temperature of 60–150° C. and, under stirring, in a lubricant, till the content of the copolymers in the lubricant becomes 0.5–10 wt. percent. The tests of lubricants with additions are carried out on a four-ball friction tester with steel balls 12.7 mm. in diameter, over a period of time from 5 seconds to 2 hours, at a temperature of 0–250° C. and under a load on the shaft of 15–90 kg. The results of the tests are judged by the magnitude of the wear spot on the balls. Thus, when using a lubricating oil comprising a copolymer, the diameter of the wear spot on the ball is 1.5–2.5 times less than when using the lubricating oil without the copolymer additions.

For a better understanding of the present invention, given hereinbelow are examples, illustrating the production of copolymers of ethylene with vinyltin derivatives.

EXAMPLE 1

A solution of 2 g. of di-tert.-butyl peroixde in 96 g. of vinyltriethyltin was charged in a stream of ethylene into a rocking autoclave of 100 cu. cm. capacity, preheated to 160° C. Use was made of ethylene, containing 0.0007 vol. percent of oxygen, and the autoclave was blown with ethylene till the content of oxygen became 0.0009 vol. percent. The pressure of ethylene was raised to 1400 atm., and the process of copolymerization was carried out during 20 minutes at a temperature of 160° C. During the entire process, the pressure in the autoclave was maintained to be equal to 1400 atm. by adding ethylene after each 50 atm. pressure drop. The content of vinyltriethyltin in the mixture of monomers was 75 mol. percent.

On completion of the copolymerization process, the reaction mixture was discharged from the autoclave through a system of traps, in which 54.7 g. of a liquid mass was collected. For purification, the product was dissolved at a temperature of 70° C. in 150 ml. of benzene, the solution was filtered at a temperature of 75° C., and then the copolymer was precipitated in 800 ml. of acetone at room temperature. The precipitate was separated by centrifugation and dried to constant weight at a temperature of 50° C. and a residual pressure of 2–5 mm. Hg.

There were obtained 11.5 g. of a sticky wax-like product of pale-grey color, which was soluble in benzene, xylene, toluene and lubricating oils. The copolymer contained 64.81 wt. percent of carbon and 11.37 wt. percent of hydrogen; the mineral residue after the combustion was 31.5 wt. percent. The copolymer contained 46.9 wt. percent (9.6 mol. percent) of [—$CH_2$—$CHSn(C_2H_5)_3$—] links, and had a molecular weight of 1770 (as determined cryoscopically in a solution of naphthalene). The presence of said links in the copolymer was confirmed by the IR spectrum (by the absorption of the Sn—C bond at 508 and 668 cm.$^{-1}$).

The copolymer was dissolved, at a temperature of 80° C. and under stirring, in a mineral lubricating oil (the viscosity of the oil being 64 and 11 cs. at temperatures of 50 and 100° C. respectively) to the content of the copolymer in the oil of 1 or 2.5 wt. percent. The antiwear properties of the oil with the addition were tested on a four-ball friction tester provided with steel balls of 12.7 mm. in diameter and having Rockwell hardness of 62–64. The tests were carried out at a temperature of 200° C. and under a load on the shaft equal to 25, 45 and 80 kg. With the load on the shaft equal to 25 kg., the r.p.m. of the tester was 500, the duration of the test was 1 hour; with the load on the shaft equal to 45 and 90 kg., the r.p.m. was 1500 and the duration, 10 seconds, respectively. The results of the tests are presented in the table, from which it can be seen, that for the loads ranging within 25–80 kg., in case of using an oil with the copolymer, the diameter of the wear spot on the ball is 1.2–1.7 times less than in case of using pure oil.

EXAMPLE 2

A copolymer of ethylene with vinyltriethyltin was produced by following the same procedure as described in Example 1, in the same autoclave. The initial quantity of vinyltriethyltin was 72 g., that of di-tert.-butyl peroxide was 0.1 g. The content of vinyltriethyltin in the mixture of monomers was 35 mol percent. The duration of the copolymerization reaction was 27 minutes. After the purification there were obtained 6 g. of a yellowish-grey soft sticky substance with a molecular weight of 2780. The copolymer contained 66.25 wt. percent of carbon and 11.74 wt. percent of hydrogen; the mineral residue after the combustion was 27 wt. percent. The content of

[—$CH_2$—$CHSn \cdot (C_2H_5)_3$—]

links in the copolymer was equal to 43.7 wt. percent (8.5 mol percent). The tests of the copolymer as an antiwear addition were carried out in the same fashion as in Example 1. The results of the tests are presented in the table.

EXAMPLE 3

A copolymer of ethylene with vinyltriethyltin was produced by following the same procedure as in Example 1. The initial quantity of vinyltriethyltin was 6 g., that of di-tert.-butyl peroxide was 0.008 g. The content of vinyl- triethyltin in the mixture of monomers was 2 mol percent. The duration of the copolymerization reaction was 30 minutes. There were obtained 9.5 g. of a copolymer, which was a solid white resin, more transparent than polyethylene. The copolymer contained 82.76 wt. percent of carbon and 13.97 wt. percent of hydrogen; the mineral residue after the combustion was 4.2 wt. percent. The copolymer contained 6.6 wt. percent (0.8 mol percent) of

links, had a molecular weight greater than 10,000, M.P. of 116° C., density of 0.950 g. per cu. cm., tensile strength of 130 kg. per sq. cm., relative viscosity of 1.108 (for a solution of 0.035 g. of the copolymer in 25 ml. of Decalin at 100° C.), and was easily mouldable into flexible transparent films.

EXAMPLE 4

A copolymer of ethylene with diethylmethylvinyltin was produced by following the procedure set forth in Example 1. The content of diethylmethylvinyltin in the reaction mixture was 75 g. (60 mol percent). The copolymerization process was initiated with the help of benzoyl peroxide, which in an amount of 0.085 g. was introduced into the reaction dissolved in diethylmethylvinyltin. The copolymerization of ethylene with the organovinyltin monomer was carried out under a presure of 1900 atm., at a temperature of 120° C., during 100 minutes. There were obtained 8.7 g. of the copolymer, containing 24.8 mol percent of [—$CH_2$—$CHSn(C_2H_5)_2CH_3$—] links. The copolymer was a white powder, soluble in benzene, xylene and in mineral oils. The properties of the copolymer as an antiwear addition to a mineral lubricating oil are illustrated in the table.

EXAMPLE 5

A copolymer of ethylene with trimethylvinyltin was produced by techniques similar to those described in Example 1. The content of trimethylvinyltin in the reaction mixture was 23 g. (8 mol percent).

The initiator of the process of copolymerization of ethylene with trimethylvinyltin was azo-isobutyrodinitrile, taken in an amount of 0.25 g. The copolymerization was effected under a pressure of 150 atm., at a temperature of 60° C., during 300 minutes. There were obtained 12.4 g. of the copolymer which contained 5.3 mol percent of [—$CH_2$—$CHSn(CH_3)_3$—] links. The copolymer was a grey soft substance, soluble in benzene, toluene and mineral oils. The priperties of the copolymer as an antiwear addition are presented in the table.

EXAMPLE 6

A rocking autoclave of 100 cu. cm. capacity was charged with a solution of 83 g. of triphenylvinyltin and 0.1 g. of cumene hydroperoxide as an initiator in 35 g. of tetrahydrofuran as a solvent. The charging was effected in a stream of ethylene containing 0.0007 vol. percent of oxygen. The content of triphenylvinyltin in the mixture of monomers was 77.8 mol. percent. The copolymerization of ethylene with triphenylvinyltin was carried out under a pressure of 2700 atm., at a temperature of 260° C., during 90 minutes. The resulting copolymer was discharged and purified as described in Example 1. There were obtained 4.7 g. of the product which contained 27.8 mol. percent of [—$CH_2$—$(CHSnC_6H_5)_3$—] links and was a soft brown mass, soluble in benzene, toluene and mineral oils. The properties of the copolymer as an antiwear addition are shown in the table.

EXAMPLE 7

A copolymer of ethylene with vinylbutyldiphenyltin was produced by following the procedure described in Example 1. The content of vinylbutyldiphenyltin in the reaction mixture was 42 g. (17.9 mol. percent). The initiator of the process of copolymerization of ethylene with vinylbutyldiphenyltin was di-tert.-butyl peroxide, taken in an an amount of 0.065 g. The copolymerization was carried out under a pressure of 800 atm., at a temperature of 180° C., during 30 minutes. There were obtained 7.9 g. of the copolymer, containing 12.4 mol. percent of [—CH$_2$—CHSn(C$_6$H$_5$)$_2$C$_4$H$_9$—] links; the copolymer was a white wax-like substance, soluble in benzene, xylene and mineral oils. The properties of the copolymer as an addition to a mineral lubricating oil are presented in the table.

| Material tested | Diameter of wear spot on ball, mm. | | |
| --- | --- | --- | --- |
| | Load on tester shaft, 25 kg. | Load on tester shaft, 45 kg. | Load on tester shaft, 80 kg. |
| Mineral lubricating oil | 0.63 | 0.42 | 2.13 |
| Same oil containing 1 wt. percent of copolymer obtained in Example 1 | 0.37 | 0.33 | 1.76 |
| Same oil containing 2.5 wt. percent of copolymer obtained in Example 1 | 0.40 | | |
| Same oil containing 1 wt. percent of copolymer obtained in Example 2 | 0.36 | 0.34 | 1.12 |
| Same oil containing 1 wt. percent of copolymer obtained in Example 4 | 0.35 | 0.32 | 1.70 |
| Same oil containing 1 wt. percent of copolymer obtained in Example 5 | 0.42 | 0.33 | 1.89 |
| Same oil containing 1 wt. percent of copolymer obtained in Example 6 | 0.45 | 0.35 | 1.93 |
| Same oil containing 1 wt. percent of copolymer obtained in Example 7 | 0.29 | 0.31 | 1.62 |

What is claimed is:

1. A method of producing copolymers of ethylene with vinyltin monomers of the general formula $$CH_2=CHSnR_1R_2R_3$$

where $R_1$, $R_2$, $R_3$ are radicals selected from the group consisting of alkyl radicals having from 1 to 6 carbon atoms and the phenyl radical, comprising copolymerizing ethylene with vinyltin monomers of the above-identified general formula at a molar ratio of ethylene to vinyltin monomers equal to 20–98:80–2 respectively, under a pressure of 50–3000 atm., at a temperature of 50–300° C., in the presence of an initiator of the free-radical type.

2. The method of claim 1 wherein the initiator is selected from the group consisting of peroxides and azo-compounds.

References Cited

UNITED STATES PATENTS

| | | | |
| --- | --- | --- | --- |
| 3,132,120 | 5/1964 | Graham et al. | 260—88.1 R |
| 3,143,531 | 8/1964 | Ramsden | 260—85.5 Z |
| 3,223,686 | 12/1965 | Natta et al. | 260—88.1 R |

HARRY WONG, JR., Primary Examiner

U.S. Cl. X.R.

252—49.7